G. O. WIGER.
ATTACHMENT FOR THRESHING MACHINES.
APPLICATION FILED APR. 15, 1915.
1,288,341.
Patented Dec. 17, 1918.
3 SHEETS—SHEET 1.
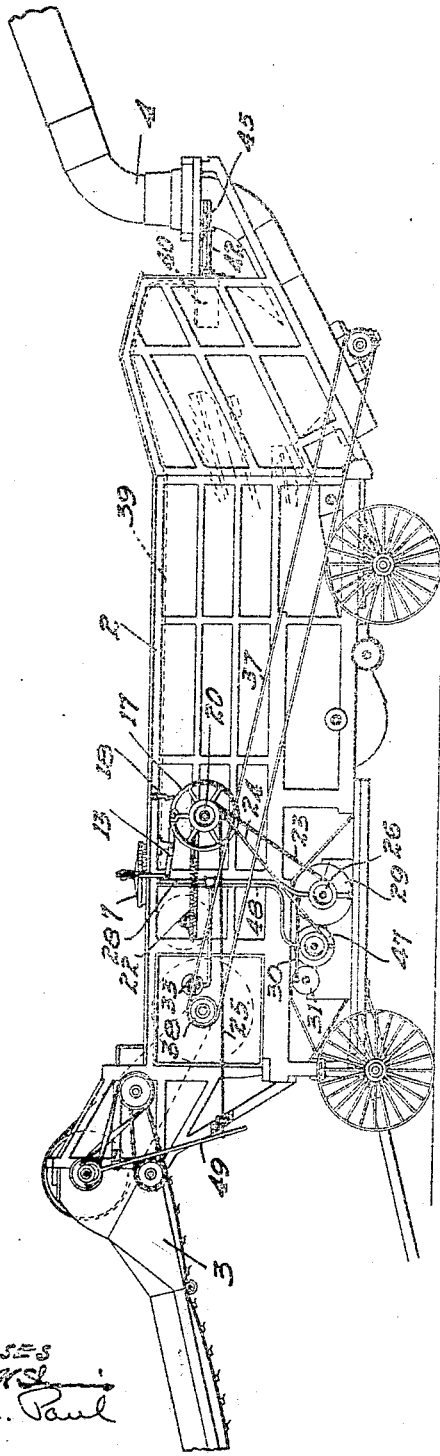
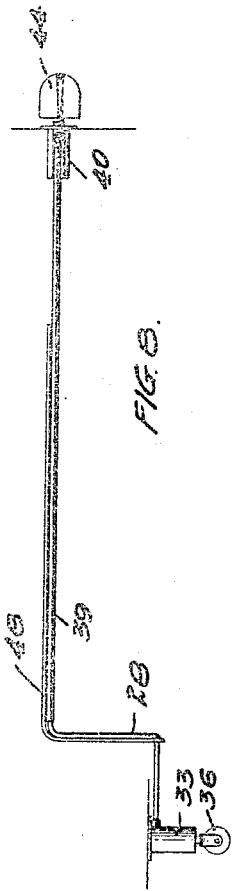
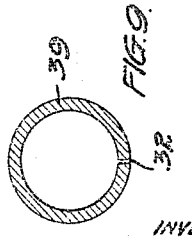
INVENTOR
GEORGE O. WIGER
ATTORNEYS

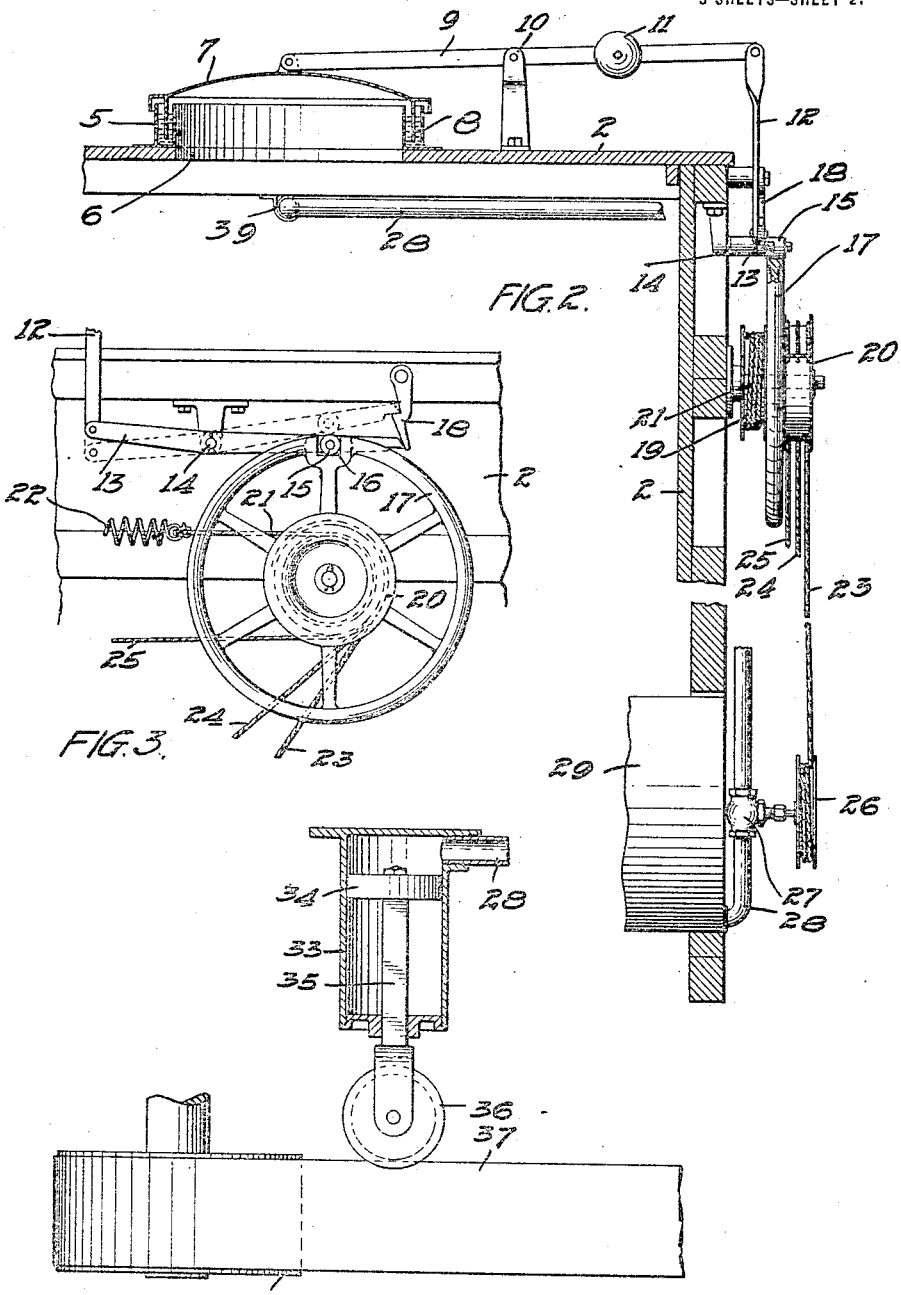

UNITED STATES PATENT OFFICE.

GEORGE O. WIGER, OF BLOOMING PRAIRIE, MINNESOTA.

ATTACHMENT FOR THRESHING-MACHINES.

1,288,341.	Specification of Letters Patent.	Patented Dec. 17, 1918.

Application filed April 15, 1915.   Serial No. 21,488.

*To all whom it may concern:*

Be it known that I, GEORGE O. WIGER, citizen of the United States, resident of Blooming Prairie, county of Steele, State of Minnesota, have invented certain new and useful Improvements in Attachments for Threshing-Machines, of which the following is a specification.

In the operation of a threshing machine or separator, as it is frequently called, it sometimes happens that the dry straw or chaff accumulated in the machine or passing through it will become ignited through friction or from some other cause and unless the flames are quickly extinguished, the machine will be seriously damaged and sometimes totally destroyed.

The object of my invention is to provide an attachment for a threshing machine which will operate automatically to stop the feed and close the mouth of the stacker and at the same time discharge a suitable extinguishing fluid, either water or a chemical preparation, within the machine to thoroughly soak the interior thereof and extinguish the fire.

A further object is to provide an attachment which can be easily and quickly applied to any style or type of thresher.

The invention consists generally in various constructions and combinations, all as hereinafter described and particularly pointed out in the claims.

Figure 5:
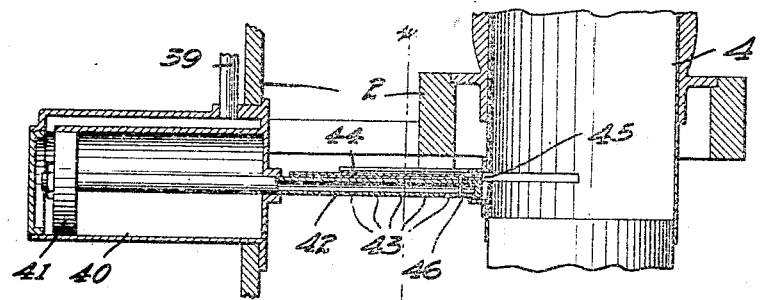
Figure 6:
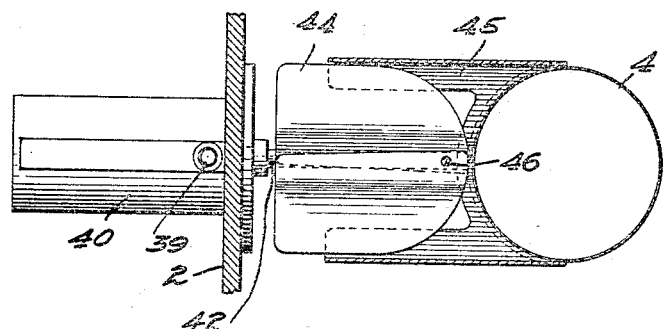
Figure 7:
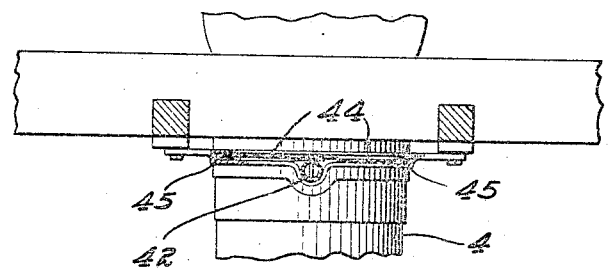

In the accompanying drawings forming part of this specification,

Figure 1 is a side elevation of a threshing machine with my invention applied thereto, Fig. 2 is a transverse sectional view through the machine, illustrating the preferred manner of mounting the device thereon, Fig. 3 is a detail view showing the trip mechanism for controlling the extinguishing device, Fig. 4 is a detail view of the device for throwing the drive belt off the machine, Figs. 5 and 6 are detail views, showing the mechanism for shutting off the feed passage through the stacker, Fig. 7 is a sectional view on the line $x$—$x$ of Fig. 5, Fig. 8 is a detail view showing the pipe connections for the device for operating the gate in the stacker tube, Fig. 9 is a transverse sectional view through the spraying or sprinkling pipe illustrated in Fig. 5.

In the drawing, 2 represents a threshing machine or separator of ordinary construction, having a feeder 3 and a stacker 4. In the top of the separator casing I arrange a cylindrical receptacle 5 adapted to contain a liquid seal and encircling an opening 6 in the top wall of the separator. This opening is closed by a cover 7 having a flange 8 which depends into the receptacle 5 and into the liquid seal therein. This cover is free to rise and fall with the increase or decrease of the air pressure in the separator. A lever 9 is pivotally connected at one end to the cover 7 and is pivotally supported on a standard 10, preferably at a point near the middle portion of the lever. A balance weight 11 is mounted on said lever by means of which the weight of the cover 7 can be accurately balanced. A link 12 connects the free end of the lever 9 with a rocker bar 13 that is pivotally supported at 14 and is provided with an anti-friction roller 15 which fits within a recess 16 provided in the periphery of a wheel 17. When this rocker arm is tilted to the position indicated by dotted lines in Fig. 3, the roller will become disengaged from the recess and the end of the arm will be swung up to a point where it will be automatically engaged and locked by a dog 18. The wheel 17 is provided with hubs 19 and 20. A cable 21 is wrapped around the hub 19 and connected to an expansion spring 22 that is fastened to the machine frame and normally tends to revolve the wheel to a point where its recess will be out of register with the anti-friction roller 15. Normally this roller acts as a lock for the wheel, but as soon as the arm 13 is operated and the wheel released, it will revolve under the tension of the spring to release the fire extinguishing device.

The drum 20 is provided with three cables, 23, 24 and 25. The cable 23 extends to a sheave 26 on the stem of a valve 27 which controls the discharge of an extinguishing fluid, usually water, through a pipe 28 from a tank 29. This tank is connected by a pipe 30 with a tank 31 containing air under pressure so that as soon as the valve 27 is opened, the liquid in the tank 29 will be forced out and discharged into the chamber within the separator through a slot 32 in the pipe or through suitable perforations therein. The pipe 28 leads to a cylinder 33 having a piston 34 provided with a stem 35 which carries a wheel 36. This wheel is adapted to bear on the edge of the drive belt 37 and when the piston 34 is operated, the belt will be forced off the pulley 38 to stop stacker fan.

The pipe 28 has a branch pipe 39 extending to a cylinder 40 having a piston 41 provided with a hollow stem 42 having perforations 43 therein and connected to valve plates 44 which overlap one another and are slidable in a guide 45 into the stacker tube 4, said plate being pivotally connected to one another at 46 and free to swing on the pivot to adapt themselves to any obstruction that may be in the pipe. The purpose of these blades 44 is to shut off the passage through the stacker and prevent the flames from spreading through the stacker tube to the stack and they will also shut off any suction or draft that may be established in the stacker tube.

A cable 24 extends to a similar sheave connected with a valve corresponding to the one described and controlling the discharge of a chemical in the form of a gas, if preferred, from a suitable tank 47 having pipe connections 48 with the interior of the separator. The cable 25 extends from the drum 20 to a friction clutch lever 49 which controls the feeder independently of the separator.

In the operation of the device, in case of ignition of the chaff or straw in the machine, the force of the explosion or the pressure of the heated air will raise the cover 7 and trip the rocker arm 13, thereby releasing the wheel 17 and opening the valve 27 to allow the discharge of water from the tank 29 and simultaneously throwing off the drive belt and closing the passage to the stacker tube. At the same time the feeder will be stopped and the valve controlling the chemical mixture will be opened to discharge its contents through the pipe 48 into the interior of the separator. In this way the flames will be confined in the casing and will be quickly smothered without damage to the machine and without setting fire to the straw on the outside of the machine.

I do not wish to be confined to the particular application of this invention to a threshing machine, as the mechanism can be modified in various ways and still be within the scope of my invention.

I claim as my invention:

1. The combination, with a threshing machine and stacker tube and a gate for closing said tube, of a drive belt and pulley therefor through which the stacker fan is operated, and mechanism rendered operative by the rise of temperature in the threshing machine above a predetermined point for closing said gate and throwing the belt off said pulley to stop the stacker fan.

2. In combination with a threshing machine and a stacker tube therefor and a drive belt for the stacker fan, means for closing the passage through said stacker tube, means for throwing said drive belt off its pulley, cylinders and pistons therefor connected with said stacker closing means and with said belt throwing means, a pipe for delivering a fluid pressure to said cylinders, and a valve for said pipe, and a drum on the valve stem, a wheel having a drum connected with said valve stem drum for opening said valve when said wheel is revolved in one direction, a spring put under tension by the revolution of said wheel, means for locking said wheel against the tension of said spring, said locking means being released when the temperature in the threshing machine rises above a predetermined point.

3. In combination with a threshing machine, a wheel mounted thereon, drums carried by said wheel, cables connected with said drums to be wound thereon, a spring put under tension by the winding of one of said cables on its drum, means for locking said wheel against revolution, a device actuated by the rise of temperature in said threshing machine for tripping said locking means, a fluid pressure supply pipe, a valve therefor connected with the other cable to be opened or closed by the revolution of said wheel, and mechanism actuated by the release of the fluid pressure upon the opening of said valve for stopping the stacker fan and closing the stacker tube.

4. In combination with a threshing machine, a rotating member mounted thereon, a spring normally tending to revolve said member in one direction, a locking device for holding said member against the tension of said spring, means actuated by the rise of temperature in the threshing machine for tripping said locking means, a cable connected with said rotating member, a fluid pressure pipe and valve therefor connected with said cable for opening or closing said valve when said member is rotated and mechanism actuated by the release of the pressure upon the opening of said valve for throwing off the drive belt of the stacker fan when the temperature therein rises above a predetermined point.

5. In combination with a threshing machine, a rotating member mounted thereon and having a notched periphery, a lever having means for entering said notch to lock said wheel against rotation in either direction, means connected with said lever for tripping it to release said wheel when the temperature in the machine rises above a predetermined point, a spring becoming operative upon the release of said member for rotating it in one direction, a fluid pressure pipe and valve therefor, means connecting said member and said valve for opening it to release said pressure when said lever is tripped, and said member is rotated by the power of said spring, and mechanism actuated by the fluid pressure for closing the threshing machine stacker tube and stopping the stacker fan upon the release and rotation of said member.

In witness whereof, I have hereunto set my hand this 12th day of April, 1915.

GEORGE O. WIGER.

Witnesses:
SAM A. RASK,
H. W. HURLBUT.

Copies of this patent may be obtained for five cents each, by addressing the "Commissioner of Patents, Washington, D. C."